April 18, 1972  E. BRICHARD  3,657,399
METHOD OF CONSTRUCTING A COMPOSITE REFRACTORY HEARTH
IN A FLOAT GLASS FURNACE
Filed Oct. 29, 1969  5 Sheets-Sheet 1

INVENTOR
EDGARD BRICHARD
BY Edmund M. Jaskiewicz
ATTORNEY

United States Patent Office 3,657,399
Patented Apr. 18, 1972

3,657,399
METHOD OF CONSTRUCTING A COMPOSITE REFRACTORY HEARTH IN A FLOAT GLASS FURNACE
Edgard Brichard, Jumet, Belgium, assignor to Glaverbel, Watermael-Boitsfort, Belgium
Filed Oct. 29, 1969, Ser. No. 873,141
Claims priority, application Luxembourg, Oct. 30, 1968, 57,193
Int. Cl. F27d 1/04, 1/10
U.S. Cl. 264—30                              3 Claims

ABSTRACT OF THE DISCLOSURE

A composite hearth is constructed by casting a first layer of refractory concrete next to the shell and while the castable is still in a plastic condition carbon bricks or blocks having grooves or undercut cavities on one face are pushed into the castable to cause the castable to enter the cavities and upon setting lock the bricks to the castable layer. Carbon powder with or without a binder can be placed in the joints between the carbon blocks. Metal anchors can also be used to hold the castable layer tightly against the shell.

---

The present invention relates to refractory structures, more particularly, to a process for manufacturing a refractory body which may be used in the construction of a furnace wall.

Furance walls have been lined with refractory ceramics and other refractory materials in the form of prefabricated blocks or bricks. Not only must the lining provide good heat insulation but must also meet other requirements based upon mechanical strength and physical behavior present at the high temperatures existing within the interior of the tank during operation.

The furnace lining must also be resistant to chemicals encountered in various industrial processes, such as by alkaline substances present in the internal atmosphere of the furnace. By way of example, in the glass manufacturing industry furnace tanks are employed to contain baths of molten glass or of molten metal or metal salts. Such baths have a strong corrosive action on many refractory substances. Those refractory substances which have the desired heat-insulating and mechanical properties do not always have the required resistance to chemical attack. Therefore, the selection of a refractory substance represents a compromise in that the properties of the substance must be balanced against each other with respect to the particular application of the refractory.

It is therefore the principal object of the present invention to provide a novel and improved process for manufacturing a refractory body particularly adapted for use in a furnace wall.

It is another object of the present invention to provide a novel and improved refractory body for furnace walls and the like.

It is another object of the present invention to provide a process of making a refractory body from different refractory materials so that the several properties of the different materials are imparted individually to the refractory body as a whole.

According to one aspect of the present invention a method of making a refractory body such as for a furnace wall and the like may comprise the step of casting a refractory mass. A covering layer is then formed on at least a portion of a surface of the refractory mass before the mass has set. At least the layer of the surface remote from the mass has a composition different from that of the mass. The covering layer may be rich in carbon and may comprise at least one prefabricated member shaped so as to interengage with the refractory mass when the mass is set.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
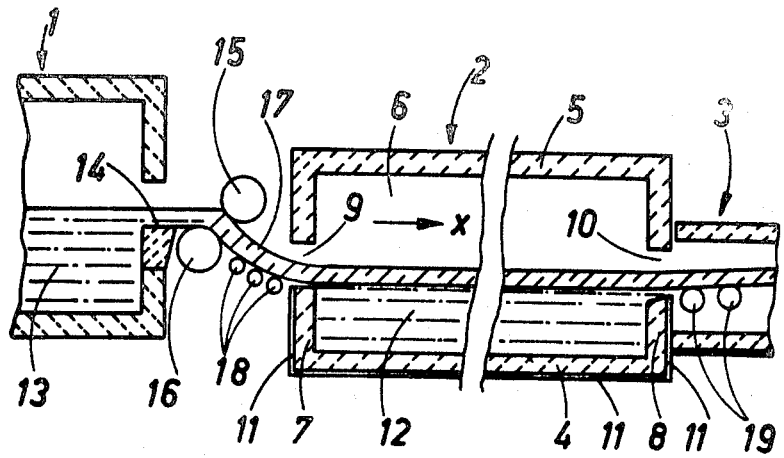
FIG. 1 is a vertical sectional view of a portion of a float tank insulation incorporating a refractory body according to the present invention.

The apparatus illustrated in FIG. 1 comprises a melting tank 1, a float tank 2 and an annealing lehr 3. The float tank comprises a bottom wall or floor 4, a crown 5, side walls 6 and end walls 7, 8 spaced from the crown 5 by slots 9, 10. All these described components of the float tank 2 are made of refractory materials. A metal wall 11 hermetically encloses the floor 4, side walls 6 and end walls 7, 8 of the tank which comprises a bath of molten material 12 which is usually molten tin but may be molten silver or a molten metal salt.

The melting tank 1 contains a bath of molten glass 13 which is cast over a casting lip 14 between casting rollers 15, 16 which shape a glass ribbon 17. The glass ribbon 17 is then conveyed by a series of transporting rollers 18 to the slot 9 of the flat tank in which it is deposited on the bath of molten material 12 while continuing to move in the direction indicated by the arrow X. The glass ribbon is fire polished on the bath of molten material 12 and moves toward slot 10 of the float tank from which it is conveyed by rollers 19 to the annealing lehr 3.

Figure 2:
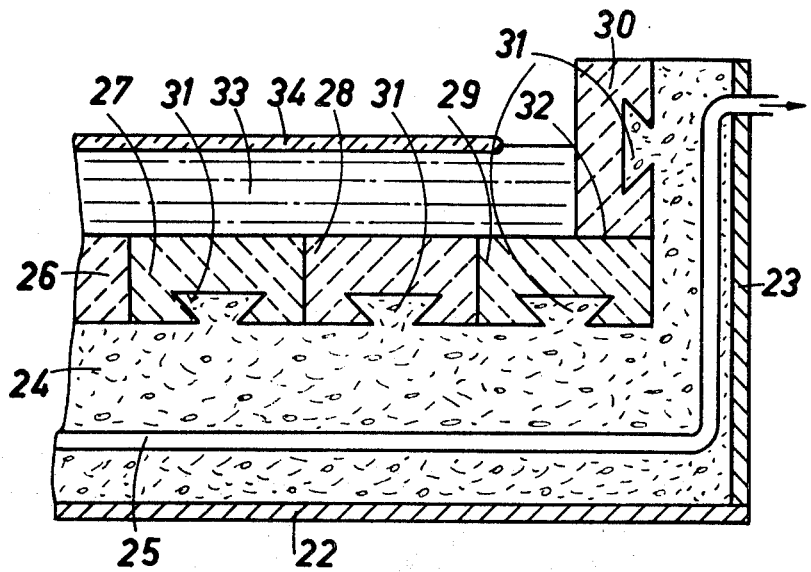
FIG. 2 is a transverse sectional view in enlarged scale of portions of a side and bottom wall of the float tank of FIG. 1.

In FIG. 2 there is illustrated a portion of the bottom wall 4 and adjoining side wall 6 of the float tank 2. These walls each comprise a layer 24 of monolithic refractory concrete on a bottom metal wall 22 and against a side wall 23. A covering layer or lining of carbon blocks 26–30 is interengaged with the interior surface of the layer 24. Each of the carbon blocks is in the form of a rectangular parallelepiped and has a longitudinally extending dove-tail groove 31 in its bottom surface. The carbon blocks 26–30 are exposed to a bath of molten material 33 which may be a molten salt or a molten metal such as tin. A glass ribbon 34 floats on the bath 33 of molten material and advances within the tank in a direction perpendicular to the plane of the drawing. A conduit 25 for conveying thermal conditioning fluid is imbedded in the refractory concrete layer 24.

In the construction of the float tank the outer metal shell formed by walls 22 and 23 defines a mold into which the refractory concrete 24 may be cast to form the bottom concrete layer after the conduits 25 have been positioned in the mold. The basic structure of the furnace wall is thus monolithic and the disadvantages generally arising from the presence of joints in the furnace walls formed by assembling rows of prefabricated bricks are avoided. The blocks 26–29 are then positioned on a surface of the layer 24 and are pressed into the surface to cause the cast concrete to enter the dove-tail grooves 31. The carbon blocks 30 for lining the side walls are then placed in position with their side faces 32 resting on the outer blocks of the layer 26. The refractory concrete is then cast between the blocks 30 and the side metal wall 23. Some of this concrete will flow into the grooves 31 in the side blocks 30. When the concrete sets the blocks lining the bottom and side walls will be interlocked or interengaged with the concrete mass and will be firmly anchored to the layer 24.

The refractory concrete in layer 24 may have a conventional composition which may depend on the various thicknesses of the layers defining a furnace wall and the grain size of its constituents. A composition of concrete may comprise 1320 kilos of chamotte grains of 1–10 mm. having 40–42% of alumina, about 400 kilos of a cement of calcium aluminate and 230 liters of water per cubic meter. Other constituents which can be employed for forming a suitable refractory concrete include corundum, sillimanite and alumina. The proportions of the constituents will also depend somewhat upon the conditions within the furnace to which the refractory body will be exposed when in use. The cast concrete mass can also be reinforced such as by imbedding metal bars and rods of various configurations therein.

After the concrete has set the tank may be heated sufficiently to degasify the refractory body forming the walls. Degasification prevents the risk of gaseous components being released into the furnace during operation. The refractory bodies which actually form parts of a furnace can be degasified before the start of the furnace operation. The degasification may require a temperature below or above the temperature to which the bodies will be subjected under normal furnace operating conditions. A negative pressure can be established within the interior of the furnace if required to facilitate the degasification.

Refractory bodies to be used in the construction of furnace walls can also be made in the form of blocks or slabs instead of being cast in the form of a monolithic layer. Such blocks or slabs are preferably cast at the site of construction since they can be then formed to a much larger size than could be conveniently stored and transported to the site. It is also apparent that the larger the size of the cast slabs the fewer will be the number of wall joints. By minimizing the number of joints in the floor or wall of a float tank the problem of sealing these joints against penetration by molten material into the furnace wall is substantially reduced.

A refractory body according to the present invention whether in the form of monolithic slabs or a prefabricated block or brick which is transported to the site has the advantage that the unitary body formed upon the setting of the cast refractory mass possesses the individual properties attributable to the various materials used in forming the refractory body. The advantages of the present invention will be apparent when considering a refractory body comprising a cast refractory mass having high heat-insulating properties and a surface coating having a thermal conductivity greater than that of the mass. The greater heat conductivity property imparted to the refractory body by the coating will materially effect the conduction of heat only along the coating and conduction of heat through the body in a direction normal to the coating surface will have the lower value inherent in the cast refractory mass. This is a contrast to the properties which would be obtained for the refractory body as a whole if the substance used for the coating layer were distributed throughout the cast mass.

The above described example of a refractory body having a highly heat-insulating refractory mass and a covering layer of greater thermal conductivity is merely illustrative but refractory bodies having different thermal conductivities in different directions are of practical importance in various furnace tanks. By way of example, in a float tank used in the manufacture of float glass, it is desired to avoid temperature gradients across transverse zones of the bath of molten material since these gradients may cause undesirable variations in the thickness of the floating glass layer throughout its width.

Constructing the bottom wall of the tank furnace from conventional refractory lining blocks may give rise to a problem since these blocks have good heat-insulating properties and as a result there is little heat conduction along the bottom wall. With the present invention, however, the bottom wall can combine a very high resistance to heat transfer through the thickness of the wall with a significantly lower resistance to heat transfer along the wall from one part of the tank interior to another. Such a thermal conductivity differential may also be utilized in the side walls of the tank.

The material having the higher thermal conductivity may extend over the entire interior surface of the bottom wall or may be limited to transverse zones spaced longitudinally within the tank so that a steeper temperature gradient can be maintained in the longitudinal direction. Any cast refractory body according to the present invention may be provided with such a covering layer on each of a plurality of spaced zones.

The present invention may also be utilized to provide refractory linings with greater resistance to chemical attack. To this end, a covering layer of electro-melted refractory material may be applied to a base mass of ordinary and less expensive refractory material.

As disclosed in FIG. 2, the interior surface of the cast refractory mass was covered by a plurality of prefabricated blocks or bricks placed in side-by-side position. If desired, only a part of the refractory mass surface may be covered by such a layer or the layer may comprise a single prefabricated element in the form of a plate or slab. The layer may also comprise material in discrete form such as granular or fibrous material. The covering layer is bonded to the refractory base mass as the mass sets. The elements comprising the covering layer may be bonded together or the joints could be filled with a bonding agent or mortar. A bonding agent may also be used to secure two or more covering layers in position. When the covering layer comprises elements of appreciably smaller size than the refractory mass it is preferable that these elements have a rectangular, hexagonal or other regular polygonal shape so that the elements can be accurately positioned in contiguous relationship to cover a given area. It is preferred that each covering layer be composed wholly or partially of carbon. Carbon is preferable since, unlike refractory concrete, it does not bubble or give off gaseous or vitreous phases. This property is of great importance for those processes in which the furnace contains a bath of molten material and the process is liable to being adversely affected by any contamination of the bath by substances evolving from the wall of the tank. In a float tank, the presence of a carbon layer in contact to the float bath is particularly important because the floating glass ribbon will not adhere to the carbon if the glass ribbon should inadvertently come into contact with the wall of the tank.

Another significant advantage of surfacing the refractory body with carbon results from the reducing properties of carbon. Carbon easily captures oxygen and releases it primarily in the form of CO. The action of carbon is thus beneficial since it is generally necessary to maintain a reducing atmosphere in furnaces in order to avoid the oxidation of various components such as conduits, supporting structures or casting rollers. Where a bath of molten material is employed in the process this bath should also be protected against oxidation. This is particularly applicable to the molten tin bath generally employed in float tanks. Presence of carbon on the interior faces of the walls of the tank thus contributes significantly to maintaining the quality of the bath.

A further advantage of carbon as a surfacing material is due to its high thermal conductivity. This is of particular importance in a float tank where heat exchange along the bottom of the tank assists in providing uniform heat transfer between different regions of the tank.

Such a covering layer for the refractory mass may be composed only partially of carbon. A refractory body according to the present invention may have at least on one of its surfaces a covering layer formed of members of the same material as the base mass and an adhering coating of carbon on the material. Substances other than carbon can be used in the same way.

When a covering layer comprises a plurality of separate members it is preferable that a bonding agent or mortar used in the joints between these members be rich in carbon. The heat conductivity of the covering layer is thus improved and if the refractories are in contact with molten material such as in a float tank penetration of molten material through the joints of the covering layer is thus prevented. Heat transfer in different directions along the furnace wall may be varied by applying a conductive bonding agent to certain joints and not to others.

While in most cases one surface of the cast refractory mass will be wholly or partially covered by a layer comprising carbon, it is pointed out that two or more surfaces of the mass can be covered in a similar manner.

In the covering layer of FIG. 2 comprising blocks 26–30, the bottom surface of each block was provided with a groove into which some of the cast refractory mass flows when the block is pressed into position on a surface of the mass. This face of a block may be provided with some other form of depression, recess or socket for securing an interlocking relationship with the cast refractory mass when the latter has set. The groove 31 may have a cross section other than trapezoidal, such as rectangular or polygonal and this groove may extend over a portion or the entire width of the face. Such grooves can be readily formed by machining the block or during the actual molding of a block depending on its composition. The block may also be provided with a projecting member, such as a tenon, on its undersurface so that this projection will extend into the plastic refractory mass when the block is pressed into position. This interlocking or interengaging relationship between the blocks comprising the covering layer and refractory mass is particularly desirable if the covering layer is in contact with a bath of molten material having a higher density than the density of the members of the covering layer.

The surface of such a covering layer may be machined, particularly where this surface is granular or particulate in form, such as when the covering layer is formed of carbon. This machining removes surface roughness and is desirable to prevent the molten material from adhering to the wall and to prevent eddy currents in the bath of molten material.

When a surface wall comprises a plurality of refractory bodies according to the present invention it is possible to dispense with any filling in the joints between the bodies when the abutting faces of these bodies are accurately formed so that a close fit is possible. However, where necessary, these joints can be filled with a cement or the joints may be covered by a refractory material applied on the interior surface of the wall.

Various modifications of the invention as disclosed above are possible as will be evident upon refrence to FIGS. 3–10.

Figure 3:
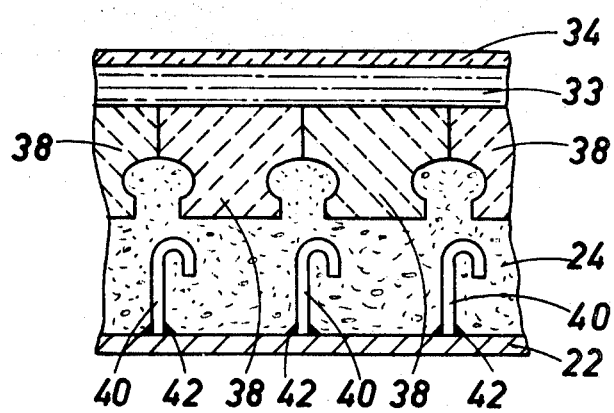
FIGS. 3–10 are transverse sectional views in enlarged scale of portions of the tank bottom wall showing modifications of the refractory body according to the present invention.

In FIG. 3 the refractory concrete layer 24 is provided with a covering layer of carbon blocks 38. Each carbon block 38 is formed with a tenon or tongue projecting from its undersurface. The tenons of adjacent blocks define grooves or recesses into which the refractory concrete enters when the blocks are pushed into position on the concrete mass when it is still in the plastic state. Bars 40 are welded at 42 to the inner surface of metal wall 22 to anchor the refractory mass 24.

Figure 4:
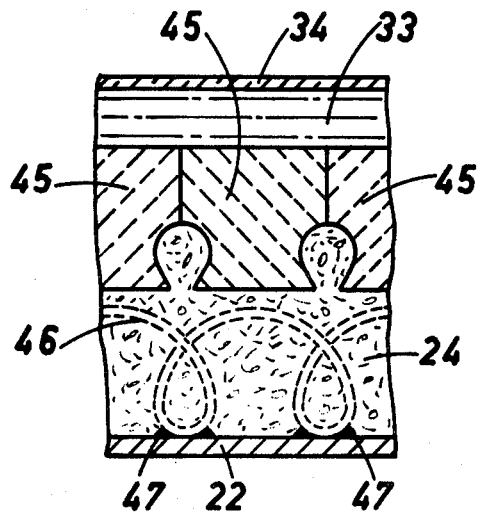

In FIG. 4, the covering layer comprises blocks 45 which are similar to the blocks 38 of FIG. 3 but the tenons have a slightly different configuration. A helical reinforcing bar 46 is imbedded in the concrete layer 24 and is welded at 47 to the inner surface of wall 22.

Figure 5:
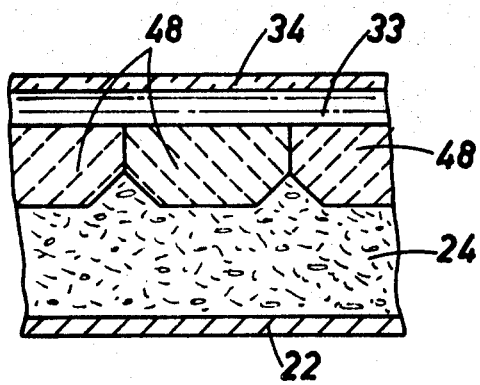

In FIG. 5, the covering layer comprises blocks 48 having inclined or chamfered edges on their bottom surfaces so that adjacent blocks define a triangular shaped groove to receive the concrete of the layer 24.

Figure 6:
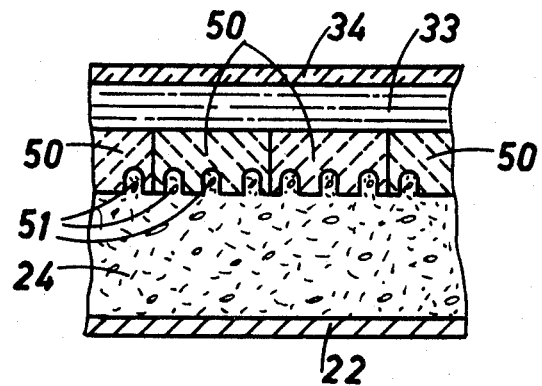

In the FIG. 6 construction, the bottom wall is lined with blocks 50 each shaped so that in the bottom thereof there are three longitudinal grooves 51 which are entered by some of the concrete of the underlying concrete layer when the blocks are pushed into position on such layer prior to the setting of the concrete.

Figure 7:
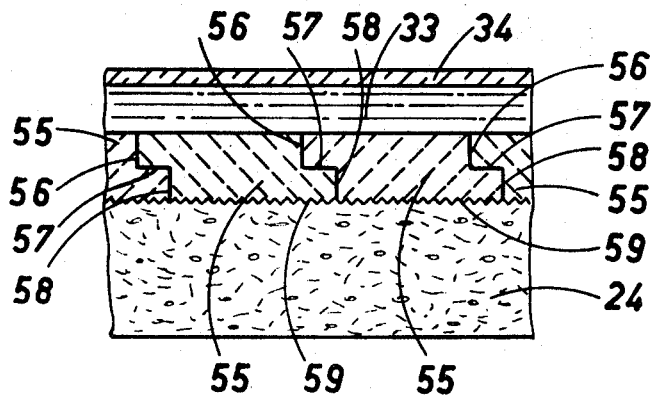

In the bottom wall construction of FIG. 7, no outer metal skin or shell is employed. The exterior surface of the bottom wall is thus defined by the concrete layer 24. The inner surface of the concrete layer is lined with a covering layer formed of carbon blocks 55 whose lateral side edges are stepped. Each lateral face comprises vertical surfaces 56 and 58 interconnected by a horizontal surface 57. Blocks of this configuration can be positioned in overlapping relationship as illustrated in FIG. 7. This overlap generally results in joints which cannot be penetrated by the molten material 33 of the bath. However, if desired, the joints between the blocks may be sealed by applying refractory cement between the adjoining surfaces 56, 57 and 58 of successive blocks. The undersurfaces 59 of the blocks are formed with a rough or irregular surface in order to secure these blocks to the underlying refractory concrete layer 24.

Figure 8:
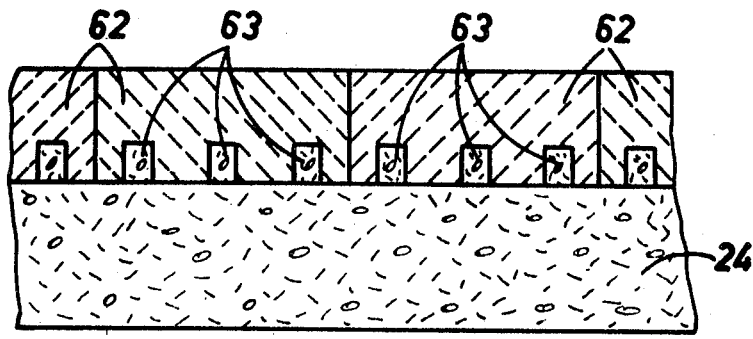

In FIG. 8, a covering layer comprises a plurality of blocks 62 in whose undersurfaces are formed a plurality of cylindrical bores 63 into which the concrete of layer 24 is forced when the blocks 62 are pressed into position.

Figure 9:
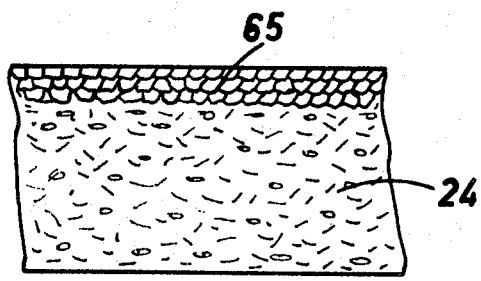

The wall illustrated in FIG. 9 comprises a monolithic refractory concrete layer 24. In the upper surface of the layer 24 there is applied carbon rubble 65 in particle or granular form. Some of the same refractory concrete as used in the layer 24 is mixed with the rubble to function as a binder. The amount of rubble progressively decreases from the outer surface in a direction toward the interior of the layer 24. The binding agent may also have fine carbon particles incorporated therein. It is also possible to apply an upper surface layer of fine carbon particles admixed in a binder over the carbon rubble. After the concrete layer 24 has set, the outer surface of the surface layer may be machined to remove the roughness and thereby eliminate the possibility of molten metal clinging to the surface.

Figure 10:
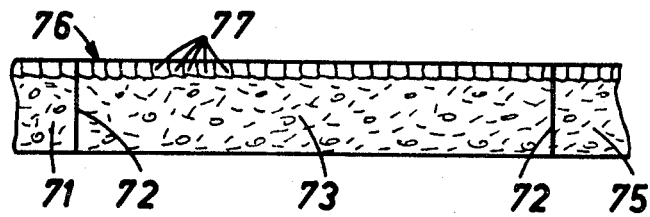

The wall construction of FIG. 10 comprises a layer of juxtaposed refractory concrete members. Each member is prefabricated and comprises a concrete base slab such as 71, 73, 75 and a surface or covering layer of small juxtaposed carbon blocks 77 positioned on the concrete mass before it sets. In order to allow for thermal expansion a space 72 may be formed between adjacent members. The joint may be formed by initially filling the space between the members with a combustible material such as plywood which will burn away when the furnace tank is operated. It is preferred to use a plurality of such separate members in large scale work rather than a single concrete mass extending over the entire wall area.

It is pointed out that the present invention not only includes the process of forming a refractory body but the refractory bodies or members formed by this process. The scope of the invention also includes any furnace wherein at least a part of at least one wall comprises a refractory body according to the present invention with a covering layer or layers on the interior surface of the wall. While the present invention is particularly applicable to float furnaces such as used in the glass making industry it is applicable in the construction of other types of furnaces such as fuel-fired or electrically heated metallurgical furnaces.

It will be understood that the present invention is susceptible to modification in order to adapt to different usages and conditions.

What is claimed is:

1. In a method of making a refractory bottom wall or floor of a float glass furnace, the steps of forming at least a portion of the said float glass bottom wall by casting a settable refractory concrete mass into the wall shape, thereafter, while the refractory mass is plastic and before it sets pressing into the surface of the plastic refractory mass, a plurality of carbon bricks which bricks consist essentially of carbon particles, each of the carbon bricks having a groove configuration in the bottom surface into which the plastic refractory mass enters when the bricks are pressed into the plastic refractory mass so that the bricks are firmly anchored to the refractory mass upon setting, the carbon bricks being positioned on the surface of the refractory mass in side-by-side relationship to form a float glass wall surface comprising a minimum number of joints whereby the penetration of molten material into the wall surface is substantially reduced.

2. In a method as claimed in claim 1 wherein between said bricks, there is a filling consisting of carbon powder.

3. In a method as claimed in claim 1 wherein between said bricks, there is a mortar comprising carbon particles and a binding agent.

References Cited
UNITED STATES PATENTS

| | | | |
|---|---|---|---|
| 2,042,870 | 6/1936 | Stafford | 264—30 |
| 3,442,669 | 5/1969 | Osterholtz | 106—56 |
| 3,442,670 | 5/1969 | Parsons | 106—56 |
| 3,486,878 | 12/1969 | Greenler | 65—182 |
| 3,492,108 | 1/1970 | Augustin et al. | 65—182 |
| 3,526,523 | 9/1970 | Holden | 106—56 |
| 3,584,475 | 6/1971 | Galey et al. | 65—182 R |
| 3,584,477 | 6/1971 | Hainsfurther | 65—182 R |
| 3,594,147 | 7/1971 | Galey et al. | 264—30 |
| 3,594,148 | 7/1971 | Smith et al. | 65—182 R |
| 1,452,432 | 4/1923 | Miller | 52—598 |
| 3,376,681 | 4/1968 | Demaison | 52—598 |

OTHER REFERENCES

H. G. Hart, "Castable Refractories," December 1954, issue of the Iron Age at 47–50.

JULIUS FROME, Primary Examiner

J. H. MILLER, Assistant Examiner

U.S. Cl. X.R.

65—182 R; 266—40, 43